July 16, 1963     A. R. NORDEN     3,098,178
NONINTERCHANGEABLE CIRCUIT BREAKER
Filed April 24, 1959
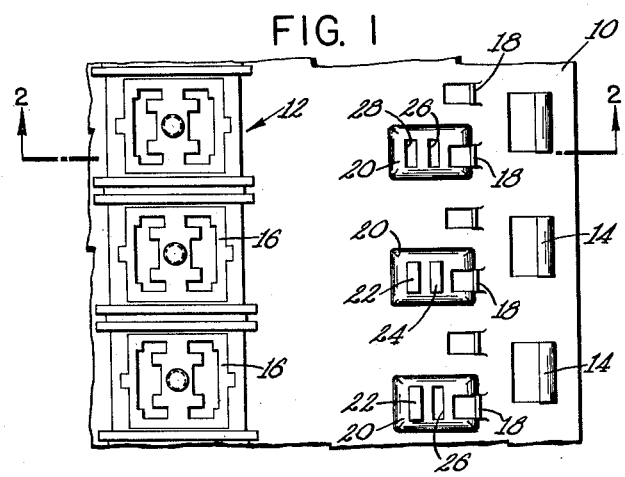
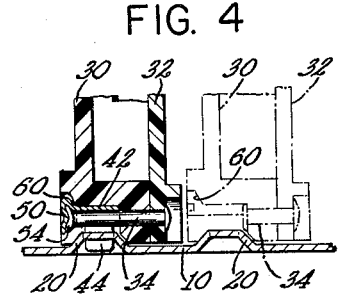
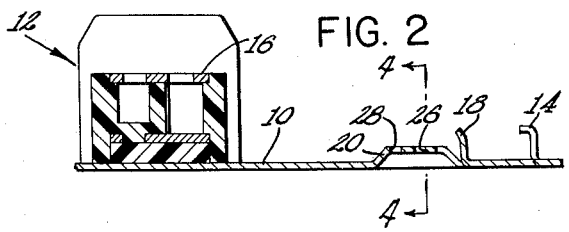
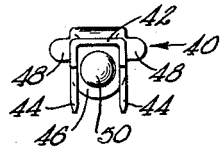
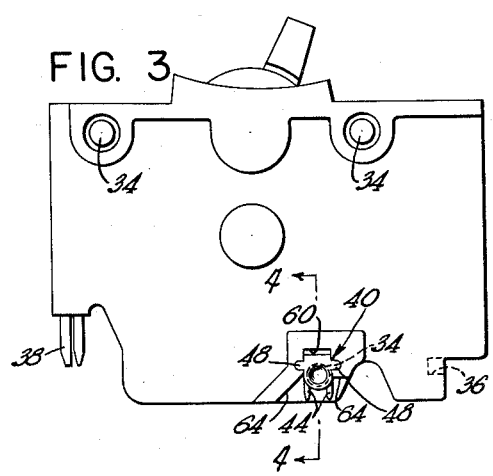
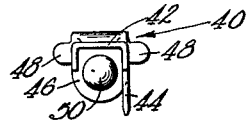
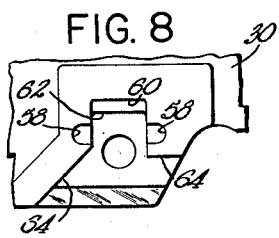
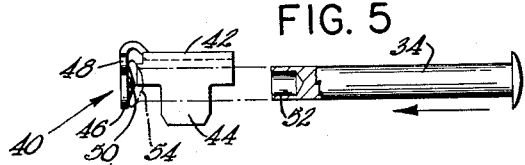
*INVENTOR.*
ALEXANDER R. NORDEN
BY *Paul S. Martin*
ATTORNEY

United States Patent Office 3,098,178
Patented July 16, 1963

3,098,178
NONINTERCHANGEABLE CIRCUIT BREAKER
Alexander R. Norden, New York, N.Y., assignor to Federal Pacific Electric Company, a corporation of Delaware
Filed Apr. 24, 1959, Ser. No. 808,710
14 Claims. (Cl. 317—119)

The present invention relates to circuit breakers and like apparatus and, more particularly, to plug-in type circuit breakers for panelboards. This invention, in one aspect, represents an improvement over apparatus disclosed and claimed in co-pending application Serial No. 773,476, filed November 12, 1958, by Cole et al.

Various types of circuit breakers and fuses have been used on standardized panelboards for providing branch-circuit protection; and heretofore a number of proposals have been advanced for insuring use of a circuit breaker, or the like, of the correct rating for protecting each branch circuit, in accordance with the gauge of wire used in that branch circuit. In general, this purpose is accomplished by providing on the circuit breaker structure characteristic of the rating thereof complementary to their companion circuit breaker receiving regions on the panelboard so as to be received only in said regions (or in a region of higher rating). For example, the circuit breaker may be provided with a number of projections that are arranged to enter corresponding cut-outs in the circuit breaker receiving regions on the panelboard. In accordance with that approach, the panelboard is not provided with any cut-outs in the critical region, and consequently such region will accept a circuit breaker of only the minimum rating classification. Heavier current ratings use corresponding circuit breakers of higher current ratings bearing projecting portions which are uniquely related to their ratings and require corresponding openings or cut-outs in the supporting panelboard to receive such breakers. The circuit breaker receiving regions of the panelboard may be readily converted to receive circuit breakers of a selected rating, but usually with specialized knowledge and tools.

In accordance with the present invention circuit breakers, and the like, can be made using a common form of enclosure, usually in the form of a two-part molded-insulation housing. The rating classification member is assembled to each circuit breaker at the time of circuit breaker manufacture, by addition of appropriate rating-classification projecting structure thereto. A feature of this invention is in the provision of a rating-classification member in a circuit breaker casing in a simple, reliable and effective manner. A further feature and object of the invention resides in the provision of a rating-classification member on a circuit breaker, or the like, of a form and arrangement to resist tampering and removal. A still further feature and object of the invention resides in the provision of a unique and improved method of forming a circuit breaker or the like with a tamper-proof rating-classification member.

The nature of the invention and its various features of novelty and further objects will be apparent from the following detailed disclosure of an illustrative embodiment thereof, shown in the accompanying drawings. In those drawings:

FIG. 1 is the fragmentary plan view of a supporting panelboard for circuit breakers or the like, intended for circuit breakers exemplified by the form illustrated in FIG. 3;

FIG. 2 is a fragmentary cross-sectional view of the circuit breaker panelboard taken along the line 2—2 of FIG. 1;

FIG. 3 is the side elevational view of a circuit breaker embodying features of the present invention;

FIG. 4 is a fragmentary cross-sectional view of a circuit breaker embodying features of the present invention taken along the line 4—4 of FIG. 3 and supported by a panelboard also shown in section along the line 4—4 of FIG. 2; there being an additional circuit breaker shown assembled thereto in phantom;

FIG. 5 is an enlarged side view showing a rating-classification member and companion rivet of the circuit breaker in FIGS. 3 and 4, diagrammatically illustrating the manner of their assembly to each other;

FIG. 6 is an enlarged view of the rating-classification member shown in FIG. 3, viewed from the opposite end thereof;

FIG. 7 is a view similar to FIG. 6 showing a modified form of rating-classification member; and FIG. 8 is an enlarged fragmentary detail view of the circuit breaker casing showing the rating-classification member region.

Referring to FIGS. 1 and 2 of the drawings, there is illustrated a circuit breaker receiving panelboard suitable for the plug-in mounting of circuit breakers in the forms shown in Patent No. 2,647,225, issued to T. M. Cole et al., and in an application of T. M. Cole, Serial No. 331,871, filed Januaury 19, 1953, now Patent No. 2,921,240, said patents and application being assigned to the assignee herein. This supporting panelboard for circuit breakers includes a metal plate 10 having a raised slotted bus assembly generally designated 12 and a row of upstanding hooks 14, there being one hook 14 opposite each metal soltted plug-in bus terminal 16 of the plug-in bus assembly 12. The hook 14 and the plug-in bus terminal 16 define a circuit breaker receiving region to accommodate a 1-inch wide circuit breaker. However, each such region can also accept two half-inch wide circuit breakers disposed in side-by-side relation as disclosed in the abovementioned patent application of T. M. Cole, Serial No. 331,871. Such half-inch wide circuit breakers have respective plug-in terminals which are received in portions of the plug-in bus terminal 16 and they also have formations which cooperate with hooks 14. Additionally, however, they have recesses which cooperate with projecting locating elements 18 struck integrally from panel 10 in predetermined relation with hooks 14.

Panel 10 has a generally rectangular bulging rating-classification formation 20 at each circuit breaker receiving region which is formed with similar removable knock-outs 22 and 24. Formations 20 are laterally offset with respect to median lines extending between hooks 14 and terminals 16. The knock-outs 22 and 24 are sheared so as to be removable from the bottom side only of the panelboard. Any desired number of knock-outs may be provided in accordance with the range of circuit breaker ratings to be accommodated at each region. In some of the regions of the panelboard, both of the knock-outs can be left intact and such region would then be identified with circuit breakers of the minimum rating-classification as, for example, 15 and 20 ampere ratings. In other regions one or both knockouts may be removed to classify the regions according to the rating-classification of a mating circuit breaker. Thus in selected regions, one of the knock-outs may be removed to define an opening 26 left in the panelboard, such regions thus being modified to accommodate circuit breakers of a heavier rating-classification as, for example, 25 to 50 ampere ratings. In other regions, both knock-outs 22 and 24 may be removed from the rating-classification formation 20, leaving openings 26 and 28 in the panelboard, such regions thus being modified to accommodate circuit breakers of the heaviest rating-classification, 55 to 100 amperes, for example. It is evident that if an additional rating-classification group were desired, knock-out 24 might be retained in place and knock-out 22 removed for uniquely identifying the region with a still further rating-classification group. It is apparent that various other patterns of knock-outs and openings at formations 20 may be adopted to further increase the number of rating-classification groups.

The supporting panel of FIG. 1 and FIG. 2 is suitable for accommodating circuit breakers and like devices such as that shown in FIG. 3, which includes a housing of molded insulation material comprising a casing 30 and a cover 32, united by three rivets 34 that extend perpendicularly through the generally flat casing and cover. The casing includes a recess 36 that is intended to function in the manner of a separable hinge in cooperation with hook 14 when the circuit breaker is being mounted on the panel and for mechanically retaining that end of the circuit breaker against the supporting panel 10. The opposite end of the breaker is provided with a plug-in metal terminal 38 which is disposed to enter the corresponding opening in the plug-in bus terminal 16 when the breaker is swung into assembled position.

Pursuant to the present invention, a rating-classification member 40 is received in a recessed portion of the circuit breaker casing 30, member 40 including a channel portion 42, a pair of oppositely disposed legs 44 extending from the walls of channel portion 42, and an end portion 46 disposed perpendicularly to the channel portion. Ears or lateral extensions 48 on portion 46 are snugly received in complementary recesses 58 in the casing 30 as shown in FIG. 3, for preventing rotation of member 40 about the axis of the channel portion 42. A generally conical inwardly directed bulging region 50 in end portion 46 is provided for spreading the hollow end 52 of a companion rivet 34 on assembly so as to define an enlarged or flanged end 54 which is confined between the end portion 46 of the rating-classification member and the adjacent opposite edges of channel 42. Rating-classification member 40 is received in a recess in casing 30 which is complementary to channel portion 42, said recess being relieved so that like legs 44 have unobstructed space about them. The legs 44 terminate substantially at the level of the adjacent sidewall of the casing. On assembly, rivet 34 is received in the channel portion 42, rating-classification member 40 being thus confined between the rivet at its inside surface and the complementary recess in casing 30 at the outside surface of its channel portion 42.

The hollow end portion 52 of rivet 34 is necessarily of malleable stock so that it can be spread or flanged and function as required of rivets. However, if such end portion of the rivet were exposed and accessible, it would be easily possible to dril away the flanged portion 54 so that the rivet could be removed to defeat or eliminate the rating-classification member. This would mean that a circuit breaker having such rating-classification member which normally cannot be received at panelboard regions having both knock-outs 22 and 24 intact and thereby identified with a circuit breaker of lowest rating-classification could be received in such region to defeat the original purpose of the circuit breaker. Thus the tampering with and removal of the rating-classification member would permit a circuit breaker to be installed in a region classified for a circuit breaker of lower rating resulting in improper branch circuit protection. Pursuant to the present invention however rating-classification member 40 is of hardened steel and thus resists any effort at tampering with the rating-classification member to frustrate efforts designed to achieve improper breaker substitution.

With reference to FIG. 8, there is shown a detail view of the casing 30, including a protruding casing portion 56 in which are formed two shallow opposed recesses 58 complementary to ears 48 of rating-classification member 40 to receive the same. Additionally, a recess 60 is provided (see also FIG. 4) for accommodating the portion of member 40 that interconnects channel portion 42 and end portion 46 and a relatively long channel 62 that embraces said channel portion. Channel 62 has a lower limit defined by surfaces 64 which define an area of clearance from which legs 44 project at the recessed portion of the breaker casing. The rating-classification member shown in FIG. 7 corresponds in all respects to rating-classification member 40 except that the former is provided with a single leg 44 for accommodation in a correspondingly classified region in which one knock-out is removed to receive such leg.

The circuit breaker is basically of conventional construction and outline and the housing encloses the operative mechanism thereof. Normally an improper breaker substitution is rejected by the knock-out or knock-outs remaining in place at the circuit breaker receiving region. The circuit breakers of the present invention may be used with standard panelboards having standard circuit breaker receiving regions since the legs 44 do not project beyond the bottom wall of the casing.

Various additional modifications of the above embodiments of the invention will readily occur to those skilled in the art, and therefore the invention should be broadly construed in accordance with its full spirit and scope.

Having thus described my invention what I claim as new and desire to secure by Letters Patent is:

1. A circuit breaker including a casing and cover of insulation material containing the operative mechanism thereof, a plurality of rivets extending perpendicularly through said casing and cover and uniting the same, and rating-classification means including a channel portion having at least one upstanding leg and an end portion extending transversely of the end of the channel portion and laterally spaced slightly therefrom, said end portion having a bulge directed inwardly towards said end of the channel portion, said casing having a recessed region around one of said rivets, said one rivet extending lengthwise in said channel portion, the space between said one rivet and said recessed portion of the casing being substantially filled by said channel portion, and said one rivet having a flanged end confined between said end portion and the adjacent edges of the channel portion.

2. A circuit breaker including a casing and cover of insulation material containing the operative mechanism thereof, a plurality of rivets extending perpendicularly through said casing and cover and uniting the same, and rating-classification means including a channel portion having at least one upstanding leg and an end portion extending transversely of the end of the channel portion and laterally spaced slightly therefrom, said end portion having a bulge directed inwardly towards said end of the channel portion, said casing having a recessed region around one of said rivets, said one rivet extending lengthwise in said channel portion, the space between said one rivet and said recessed portion of the casing being substantially filled by said channel portion, said rating-classification means and casing having interengageable portions inhibiting rotation of the former about the axis of said channel portion, and said one rivet having a flanged end confined between said end portion and the adjacent edges of the channel portion.

3. A circuit breaker including a casing and cover of insulation material containing the operative mechanism thereof, a plurality of rivets extending perpendicularly through said casing and cover and uniting the same, and rating-classification means including a channel portion having at least one elongated side wall and an end portion extending across the end of the channel portion and spaced slightly therefrom, said end portion having an inwardly directed bulge, said casing having a recessed region around one of said rivets, said one rivet extending lengthwise in said channel portion, the space between said one rivet and said recessed portion of the casing being substantially filled by said channel portion, said end portion having laterally extending ears received in complementary recesses in said casing, and said one rivet having a flanged end confined between said end portion and the adjacent edges of the channel portion.

4. A circuit breaker including a casing and cover of insulation material containing the operative mechanism thereof, means uniting said casing and cover including a rivet extending perpendicularly therethrough adjacent the bottom surface of the circuit breaker, and rating-classification means including a channel portion having at least one upstanding rate classification leg and an end portion extending transversely of the end of the channel portion and laterally spaced slightly therefrom, said end portion having a bulge directed inwardly towards said end of the channel portion, said casing having a recessed region around said rivet, the latter extending lengthwise in said channel portion, the space between said rivet and said recessed portion of the casing being substantially filled by said channel portion, and said rivet having a flanged end confined between said end portion and the adjacent edges of the channel portion.

5. A circuit breaker including a casing and cover of insulation material containing the operative mechanism thereof, means uniting said casing and cover including a rivet extending perpendicularly therethrough adjacent the bottom surface of the circuit breaker, and rating-classification means including a channel portion having at least one upstanding rate classification leg and an end portion extending transversely of the end of the channel portion and laterally spaced slightly therefrom, said end portion having a bulge directed inwardly towards said end of the channel portion, said casing having a recessed region around said rivet, the latter extending lengthwise in said channel portion, the space between said rivet and said recessed portion of the casing being substantially filled by said channel portion, and said rivet having a flanged end confined between said end portion and the adjacent edges of the channel portion, said rivet having an end portion of malleable stock and said rating-classification means being of hardened stock.

6. A circuit breaker including a casing and cover of insulation material containing the operative mechanism thereof, means uniting said casing and cover including a rivet extending perpendicularly therethrough adjacent the bottom surface of the circuit breaker, and rating classification means including a channel portion having at least one upstanding rate classification leg and an end portion extending transversely of the end of the channel portion and laterally spaced slightly therefrom, said end portion having a bulge directed inwardly towards said end of the channel portion, said casing having a recessed region around said rivet, the latter extending lengthwise in said channel portion, the space between said rivet and said recessed portion of the casing being substantially filled by said channel portion, and said rivet having a flanged end confined between said end portion and the adjacent edges of the channel portion, said rate classification leg extending no further than said bottom surface of the circuit breaker whereby the latter may be used with standard panelboards having standard circuit breaker receiving regions.

7. A circuit breaker including a casing and cover of insulation material containing the operative mechanism thereof, a plurality of rivets extending perpendicularly through said casing and cover and uniting the same, and rating-classification means including a channel portion having at least one elongated side wall and an end portion extending across the end of the channel portion and spaced slightly therefrom, said end portion having an inwardly directed bulge, said casing having a recessed region around one of said rivets, said one rivet extending lengthwise in said channel portion, the space between said one rivet and said recessed portion of the casing being substantially filled by said channel portion, said end portion having laterally extending ears received in complementary recesses in said casing, and said one rivet having a flanged end confined between said end portion and the adjacent edges of the channel portion, said one rivet being disposed adjacent the bottom surface of the circuit breaker and having an end portion of malleable stock, and said rating-classification means being of hardened stock with said bulge thereof being disposed substantially coaxially of said channel portion.

8. A circuit breaker adapted to be mounted on a panelboard having a companion hook and plug-in terminal bus, and having a supporting surface therebetween for the bottom of the circuit breaker, said circuit breaker including a casing and a cover of insulation material containing the operative mechanism thereof, said casing having a recess for cooperating with said panelboard hook in the manner of a seperable hinge and said circuit breaker also having a plug-in terminal for plug-in connection to said plug-in terminal bus, said casing and cover having a bottom wall between said recess and said plug-in terminal in combination with a rating-classification member, a plurality of rivets uniting said casing and cover to each other and including one rivet adjacent said bottom surface of the circuit breaker, said rating-classification member having a channel portion about said one rivet and having at least one upstanding rating-classification wall of the channel portion with a free space thereabout for cooperation with a companion rating-classification opening in the panelboard.

9. A circuit breaker adapted to be mounted on a panelboard having a companion hook and plug-in terminal bus, and having a supporting surface therebetween for the bottom of the circuit breaker, said circuit breaker including a casing and a cover of insulation material containing the operative mechanism thereof, said casing having a recess for cooperating with said panelboard hook in the manner of a separable hinge and said circuit breaker also having a plug-in terminal for plug-in connection to said plug-in terminal bus, said casing and cover having a bottom wall between said recess and said plug-in terminal in combination with a rating-classification member, means uniting said casing and cover including a rivet adjacent said bottom surface of the circuit breaker, a portion of said rivet being exposed by and external to said casing, said rating-classification member having an elongated part engaged by and retained in position by said external portion of said rivet and having at least one upstanding rating-classification wall of said part with a free space thereabout for cooperation with a companion rating-classification opening in the panelboard.

10. A circuit breaker adapted to be mounted on a panelboard having a companion hook and plug-in terminal bus, and having a supporting surface therebetween for the bottom of the circuit breaker, said circuit breaker including a casing and a cover of insulation material containing the operative mechanism thereof, said casing having a recess for cooperating with said panelboard hook in the manner of a separable hinge and said circuit breaker also having a plug-in terminal for plug-in connection to said plug-in terminal bus, said casing and cover having a bottom wall between said recess and said plug-in terminal in combination with a rating-classification member, a plurality of rivets uniting said casing and cover to each other and including one rivet adjacent said bottom surface of the circuit breaker, said rating-classification member having a channel portion about said one rivet and having at least one upstanding rating-classification wall of the channel portion with a free space thereabout for cooperation with a companion rating-classification opening in the panelboard, said casing having a recessed region around said one rivet, the space between said one rivet and said recessed portion of the casing being substantially filled by said channel portion, said rating-classification member having an end portion extending across the end of the channel portion and spaced slightly therefrom, said end portion having an inwardly directed bulge, and said one rivet having a flanged end confined between said end portion and the adjacent edges of the channel portion.

11. The method of forming a plug-in circuit breaker or the like with a tamper-proof rating-classification member including the steps of forming a rating-classification member with at least one laterally projecting leg extending from a channel portion and with an end portion extending across the end of the channel portion and formed with an inward bulge, hardening said rating-classification member, and uniting said rating-classification member to the body of the circuit breaker or the like by driving a hollow-ended rivet through the casing and along the channel portion so that the hollow end of the rivet strikes against the inwardly bulged end portion of the rating-classification member so as to spread laterally into the confined space between the end portion and the opposed edges of the channel portion.

12. The method of forming a plug-in circuit breaker or the like with a tamper-proof rating-classification member including the steps of forming a rating-classification member with at least one laterally projecting leg extending from a channel portion and with an end portion extending across the end of the channel portion in spaced relation therewith and formed with an inward bulge, hardening said rating-classification member, and uniting said rating-classification member to the body of the circuit breaker or the like by placing said member in a recessed region of the body provided therefor and driving a hollow-ended rivet through the casing and along the channel portion so that the hollow end of the rivet strikes against the inwardly bulged end portion of the rating-classification member so as to spread laterally into the confined space between the end portion and the opposed edges of the channel portion.

13. A circuit breaker including an enclosure of insulating material containing the operative mechanism thereof, said enclosure having a recess, a rivet extending through a portion of said enclosure and into the recess, and a circuit breaker rating-classification member in the form of a channel confined between said rivet and the surface of said recess, said rating-classification member having at least one projecting rating-classification leg.

14. A circuit breaker including an enclosure of insulating material containing the operative mechanism thereof, said enclosure having a recess, a rivet extending through a portion of said enclosure and into the recess, and a circuit breaker rating-classification member in the form of a channel confined between said rivet and the surface of said recess, said rating-classification members having at least one projecting rating-classification leg, said rivet and said rating-classification member having mutually interengaging portions effective to maintain both the rivet and the rating-classification member in assembly to each other and to said enclosure.

References Cited in the file of this patent

UNITED STATES PATENTS

| | | |
|---|---|---|
| 2,647,225 | Cole et al. | July 28, 1953 |
| 2,809,361 | Woofter | Oct. 8, 1957 |
| 2,883,586 | Christensen | Apr. 21, 1959 |
| 2,916,675 | Middendorf | Dec. 8, 1959 |
| 2,921,240 | Cole | Jan. 12, 1960 |
| 2,928,998 | Brumfield | Mar. 15, 1960 |
| 3,046,453 | Martin | July 24, 1962 |

FOREIGN PATENTS

| | | |
|---|---|---|
| 747,600 | France | June 20, 1933 |